United States Patent
Yousef et al.

(10) Patent No.: US 7,215,725 B2
(45) Date of Patent: May 8, 2007

(54) ENHANCED CHANNEL PARAMETER ESTIMATION IN THE PRESENCE OF PREAMBLE ERASURES

(75) Inventors: Nabil R. Yousef, Foothill Ranch, CA (US); Jonathan S. Min, Buena Park, CA (US)

(73) Assignee: Broadcom Corporation, Irvine, CA (US)

( * ) Notice: Subject to any disclaimer, the term of this patent is extended or adjusted under 35 U.S.C. 154(b) by 1013 days.

(21) Appl. No.: 10/291,055

(22) Filed: Nov. 8, 2002

(65) Prior Publication Data

US 2004/0066800 A1 Apr. 8, 2004

Related U.S. Application Data

(60) Provisional application No. 60/416,928, filed on Oct. 8, 2002.

(51) Int. Cl.
*H03D 1/04* (2006.01)
*H04B 1/38* (2006.01)
*H04N 7/173* (2006.01)
(52) U.S. Cl. .................... 375/346; 375/222; 725/111
(58) Field of Classification Search ............... 375/147, 375/150, 219, 222, 329, 344, 345, 346; 725/11
See application file for complete search history.

(56) References Cited

U.S. PATENT DOCUMENTS

| | | | |
|---|---|---|---|
| 6,175,559 B1* | 1/2001 | Brown | 370/335 |
| 6,791,995 B1* | 9/2004 | Azenkot et al. | 370/436 |
| 7,050,419 B2* | 5/2006 | Azenkot et al. | 370/347 |
| 2003/0039203 A1* | 2/2003 | Moon | 370/203 |

* cited by examiner

*Primary Examiner*—Young T. Tse
(74) *Attorney, Agent, or Firm*—Garlick Harrison & Markison; Bruce E. Garlick

(57) ABSTRACT

A communication device processes a preamble in the presence of impulse noise. The communication device receives a preamble sequence that includes a plurality of preamble symbols and determines that at least one preamble symbol of the plurality of preamble symbols has been adversely affected by impulse noise. Based upon this determination, the communication device masks the at least one preamble symbol of the plurality of preamble symbols to produce a subgroup of preamble symbols. Then, based upon the subgroup of preamble symbols, the communication device determines at least one of a frequency estimate for the subgroup of preamble symbols, a phase estimate for the subgroup of preamble symbols, and a gain estimate for the subgroup of preamble symbols. Based upon these estimates, the communication receiver corrects subgroup of preamble symbols and uses the result to perform channel estimation, to correct subsequently received symbols carrying data, etc., and performs additional operations based upon the corrected preamble symbols.

29 Claims, 13 Drawing Sheets

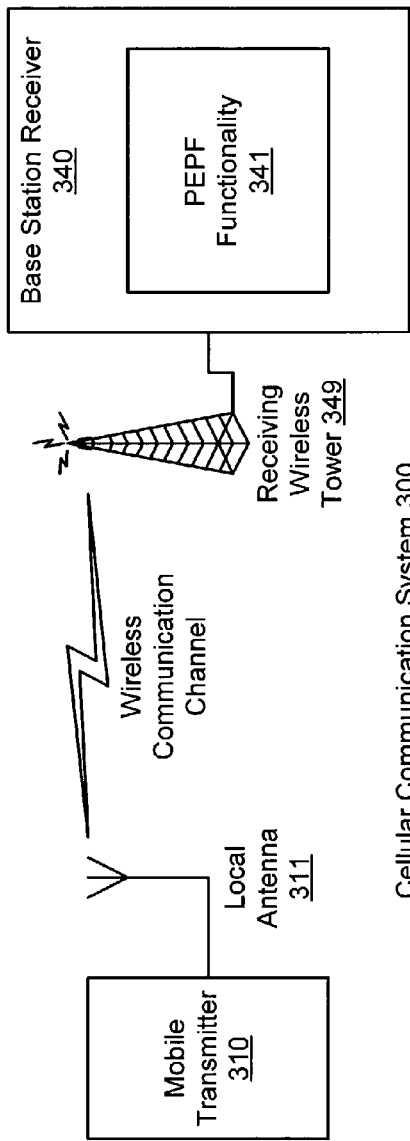
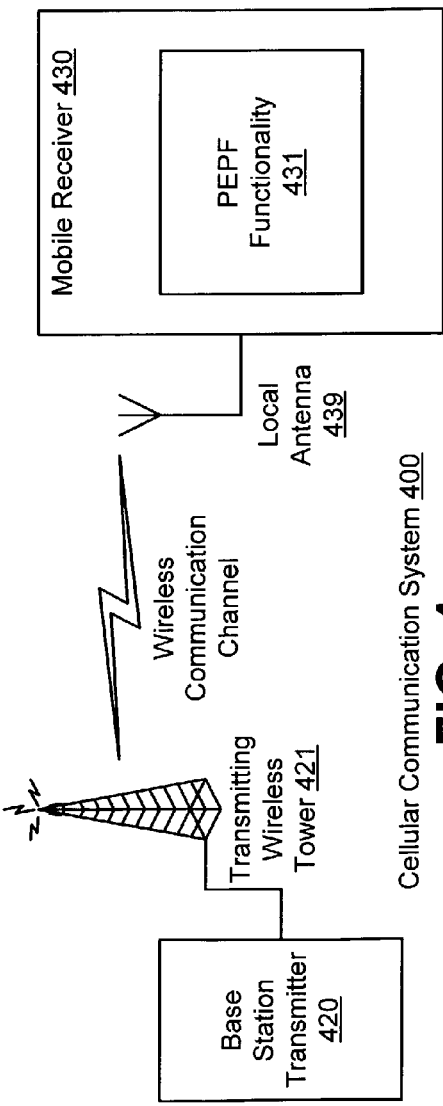

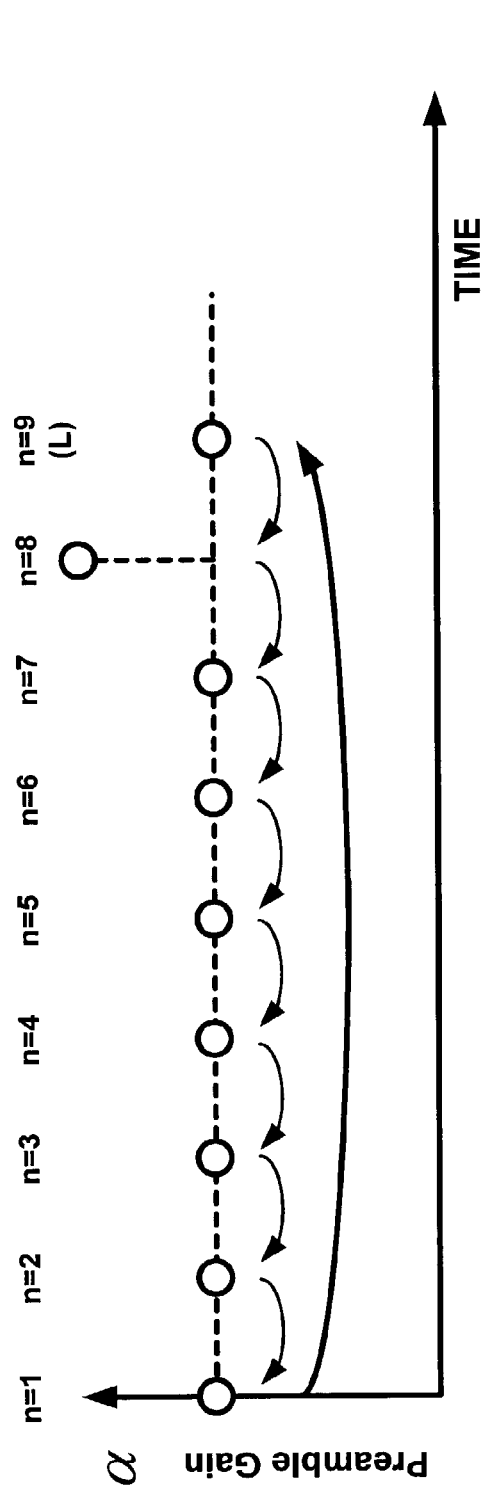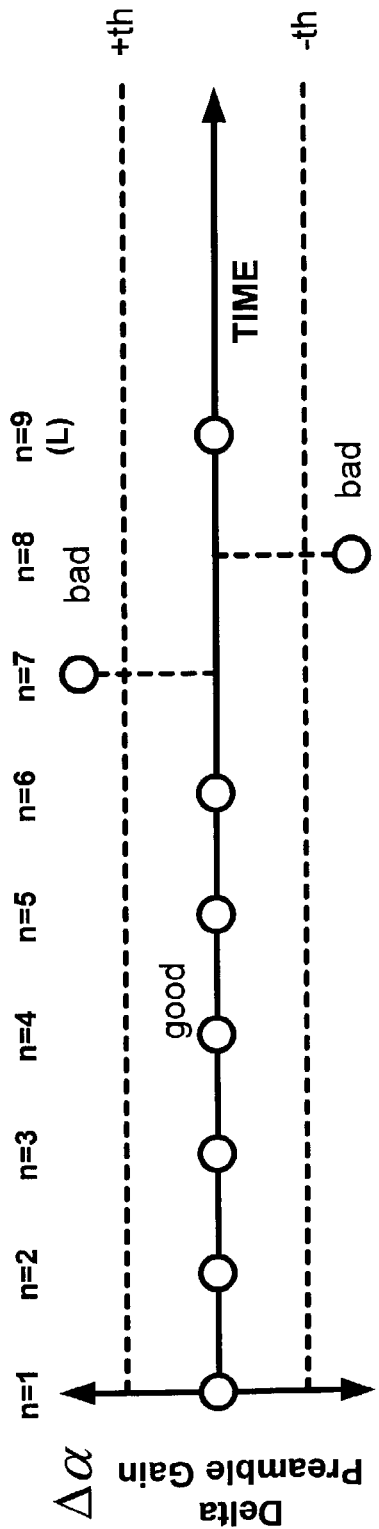
FIG. 9
FIG. 10

ENHANCED CHANNEL PARAMETER ESTIMATION IN THE PRESENCE OF PREAMBLE ERASURES

CROSS REFERENCE TO RELATED APPLICATION

This application claims priority to U.S. Provisional Application Ser. No. 60/416,928, filed Oct. 8, 2002, which is incorporated herein by reference in its entirety for all purposes.

BACKGROUND

1. Field of the Invention

This invention relates generally to digital communications; and more particularly to preamble processing in a digital communication system.

2. Background of the Invention

The structure and operation of communication systems is generally known. Many communication systems carry data, e.g., voice, audio, video, file, or other digital data that is sent from a transmitter to a receiver. On the transmitter side, data is first formed into packets. This data may be raw data or encoded data that represents the raw data. Each of these packets also typically includes a header, a known training sequence generally referred to as the "preamble", and a tail. These packets are then modulated into symbols and the symbols are transmitted by the receiver and intended for receipt by the receiver. The receiver then receives the symbols and attempt to extract the data from the packets that are carried by the symbols.

A "channel" carries the symbols from the transmitter to the receiver. A wired, wireless, optical, or another media, depending upon the communication system type, services the channel. In many communication systems, such as terrestrial based wireless communication systems, satellite based communication systems, cable based communication systems, etc., the channel distorts the transmitted symbols, from the perspective of the receiver, causing interference between a subject symbol and a plurality of symbols surrounding the subject symbol. This type of distortion is referred to as "inter-symbol-interference" and is, generally speaking, the time-dispersed receipt of multiple copies the symbols caused by multipath. The channel also introduces noise, e.g., impulse (burst) noise, into the symbols prior to their receipt. Each of these concepts is well known.

In many communications systems, a preamble sequence is used to estimate channel parameters such as carrier frequency and phase offsets, and channel gain. The channel estimate may also be used for equalizer training. In many cases, the received preamble symbols are distorted by the impulse (burst) noise. Although the burst noise might distort a limited number of preamble symbols, it might be strong enough such that whole preamble processing is degraded, which causes the communication system to loose lock (or synchronization). Degradation of preamble processing may lead to system crashes in the case of continuous transmission systems, and packet losses and reduction in the overall system capacity for packet transmission systems.

Thus there is a need in the art for improved preamble processing.

SUMMARY OF THE INVENTION

In order to overcome the shortcomings of the prior devices, among other shortcomings, a communication device constructed according to the present invention processes a preamble in the presence of impulse noise. In its operations, the communication device receives a preamble sequence that includes a plurality of preamble symbols. The communication device then determines that at least one preamble symbol of the plurality of preamble symbols has been adversely affected by impulse noise. Based upon this determination, the communication device masks the at least one preamble symbol of the plurality of preamble symbols to produce a subgroup of preamble symbols. Then, based upon the subgroup of preamble symbols, the communication device determines at least one of a frequency estimate for the subgroup of preamble symbols, a phase estimate for the subgroup of preamble symbols, and a gain estimate for the subgroup of preamble symbols.

In determining that at least one preamble symbol of the plurality of preamble symbols has been adversely affected by impulse noise, the communication device divides the plurality of preamble symbols by at least one known preamble symbol to produce a plurality of preamble gains corresponding to the plurality of preamble symbols. Finally, the communication device determines, based upon the plurality of preamble gains, that at least one preamble symbol has been adversely affected by impulse noise. In determining, based upon the plurality of preamble gains, that at least one preamble symbol has been adversely affected by impulse noise, the communication receiver first determines a gain differential sequence from the plurality of preamble gains that includes a plurality of gain differential values. The communication device then, for each gain differential value that exceeds a gain differential threshold, determines that a corresponding preamble symbol has been adversely affected by impulse noise.

In another operation, in dividing the plurality of preamble symbols by at least one known preamble symbol further produces a plurality of preamble phases corresponding to the plurality of preamble symbols. In such case, the communication device also determines, based upon the plurality of preamble phases, that at least one preamble symbol has been adversely affected by impulse noise. In one particular operation, the communication device determines from the plurality of preamble phases a phase differential sequence that includes a plurality of phase differential values. Then, for each phase differential value that exceeds a phase differential threshold, the communication device determines that a corresponding preamble symbol has been adversely affected by impulse noise.

In its further operations, the communication device masks (discards) at least one preamble symbol that has been adversely affected by impulse noise from the plurality of preamble symbols. In such case, the communication device may combine non-discarded preamble symbols of the plurality of preamble symbols of the preamble sequence to produce a composite result. Then, the communication device may apply at least one correction factor to the non-discarded preamble symbols of the plurality of preamble symbols of the preamble sequence to produce the composite result.

The communication device may service either wired or wireless links. In servicing wired links, the communication device may be a cable modem communication system receiver. In such case, the cable modem communication system is either a Cable Modem Termination System or a cable modem.

Other features and advantages of the present invention will become apparent from the following detailed description of the invention made with reference to the accompanying drawings.

BRIEF DESCRIPTION OF THE DRAWINGS

A better understanding of the invention can be obtained when the following detailed description of various exemplary embodiments is considered in conjunction with the following drawings.

FIG. 3 is a system diagram illustrating a cellular communication system having a base station receiver that services a reverse link according the invention;

FIG. 4 is a system diagram illustrating a cellular communication system having a mobile receiver that services a forward link according the invention;

FIG. 9 is a graph illustrating preamble gain of a plurality of preamble symbols as determined according to the present invention;

FIG. 10 is a graph illustrating delta preamble gain of a plurality of preamble symbols and related error detection as determined according to the present invention;

DETAILED DESCRIPTION OF A PREFERRED EMBODIMENT

Figure 1:
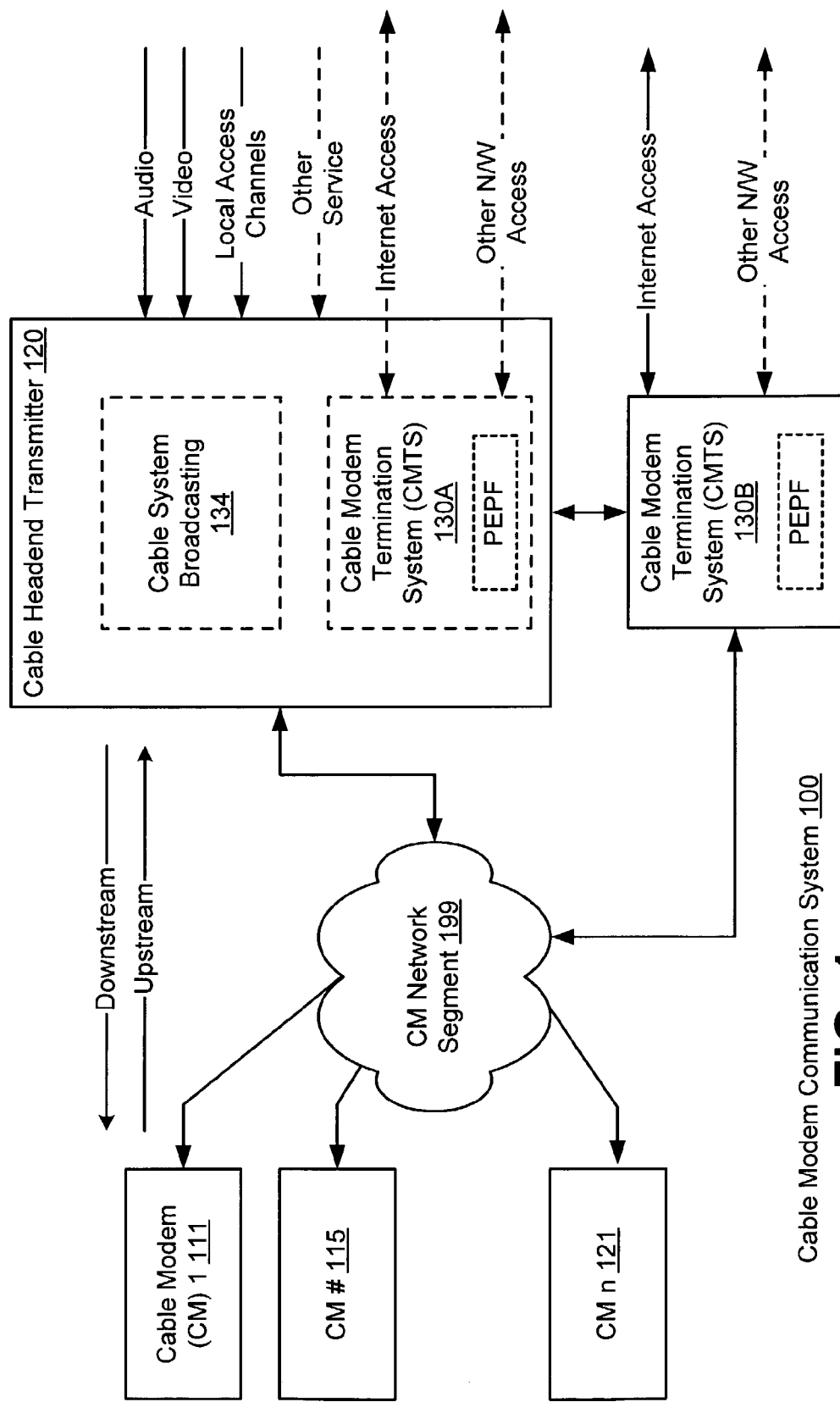
FIG. 1 is a system diagram illustrating a Cable Modem (CM) communication system that operates according to the invention.

FIG. 1 is a system diagram illustrating a Cable Modem (CM) communication system 100 that operates according to the invention. The CM communication system 100 includes a number of Cable Modems (CMs), CM 1 111, CM 2 115, . . . , and CM n 121, a Cable Headend Transmitter 120, and a Cable Modem Termination System (CMTS) 130A or 130B. The CMTS 130A or 130B is a component that exchanges modulated digital information with CMs across a cable network segment 199. A number of elements may be included within the CM network segment 199. For example, routers, splitters, couplers, relays, and amplifiers may be contained within the CM network segment 199 without departing from the scope and spirit of the invention.

In some embodiments, the CMTS 130A is contained within the Cable Headend Transmitter 120. In other embodiments, a CMTS 130B is located externally with respect to the Cable Headend Transmitter 120. The CMTS 130A or 130B may be located at a local office of a cable television company or at another location within a CM communication system. In the following description, the CMTS 130A or 130B is used for illustration; yet, the same functionality and capability as described for the CMTS 130A may equally apply to embodiments that alternatively employ the CMTS 130B. The cable headend transmitter 120 also provides a number of services including those of audio, video, local access channels, as well as any other service known in the art of cable systems using its Cable System Broadcasting 134 components. The CMTS 130A provides data services to the CMs 111, 115, . . . , 121 that may include Internet access, Wide Area Network (WAN) access, and access to other networks to which the CMTS 130A is communicatively coupled. The operation of a CMTS 130A, at the cable-provider's head-end, may be viewed as providing analogous functions provided by a digital subscriber line access multiplexor (DSLAM) within a digital subscriber line (DSL) system. As an example, the CMTS 130A is able to service as many as 1,000 users on a single 6 MHz channel. Since a single channel is capable of 30–40 megabits per second of total throughput, this means that users may see far better performance than is available with standard dial-up modems.

The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (CMs 111, 115, . . . , 121), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected CMs 111, 115, . . . , 121 from the CMTS 130B. The upstream information flows from the CMs 111, 115, . . . , 121 to the CMTS 130A. The operation of the Cable Modem Communication System 100 may be according to Time Division Multiple Access (TDMA) operations, Code Division Multiple Access (CDMA), Frequency Division Multiplexing (FDM) operations, or a combination of two or more of these. In this manner data intended for, or received from individual users is separated.

In one particular embodiment described below, the teachings of the present invention are performed within a CM communication system 100 that supports S-CDMA (Synchronous Code Division Multiple Access) operations. In such a S-CDMA system, the CMs 111–121 and the CMTS 130 communicate synchronization information to one another such that upstream transmissions from the CMs 111–121 are time aligned upon their receipt by the CMTS 130A. Synchronization of these transmissions at the CMTS 130A in the S-CDMA communication systems is extremely important. When a number of the CMs all transmit their signals at a same time such that these signals are received at the CMTS 130 on the same frequency and at the same time, they must all be able to be properly de-spread and decoded for proper signal processing. In order to achieve this goal, for a particular transmission cycle, each of the CMs 111–121 transmits to the CMTS 130A at a respective transmission time, which will likely differ from the transmission times of other CMs. These differing transmission times are based upon the relative transmission distance between the CM and the CMTS 130. These operations are supported by a determination of the round trip delays (RTPs) between the CMTS 130 and each supported CM. With these RTPs determined, the CMs may then determine at what point to transmit their S-CDMA data so that all CM transmissions will arrive synchronously at the CMTS 130A.

The CMTS 130A (or CMTS 130B) supports Preamble Erasure Processing Functionality (PEPF). As will be described further with reference to FIGS. 7–14, operation according to the present invention determines whether any of a group of preamble symbols of a received preamble is received by the CMTS 130A coincidence with receipt of burst (impulse) noise. If so, the preamble symbol is not usable. Thus, further according to the present invention, when a determination is made that the preamble symbol is erroneous (received coincident with impulse/burst noise), the CMTS 130A will extract the preamble symbol from the group of preamble symbols, yielding a subgroup of valid preamble symbols. Further according to the present invention, the subgroup of valid preamble symbols is used to estimate the frequency of the preamble, the phase of the preamble, and the gain of the preamble. These results may then be used for input gain settings, frequency correction, and phase correction of data symbols corresponding to the preamble. Further, the subgroup of valid preamble symbols may be employed for equalizer training and other operations requiring channel characterization.

Figure 2:
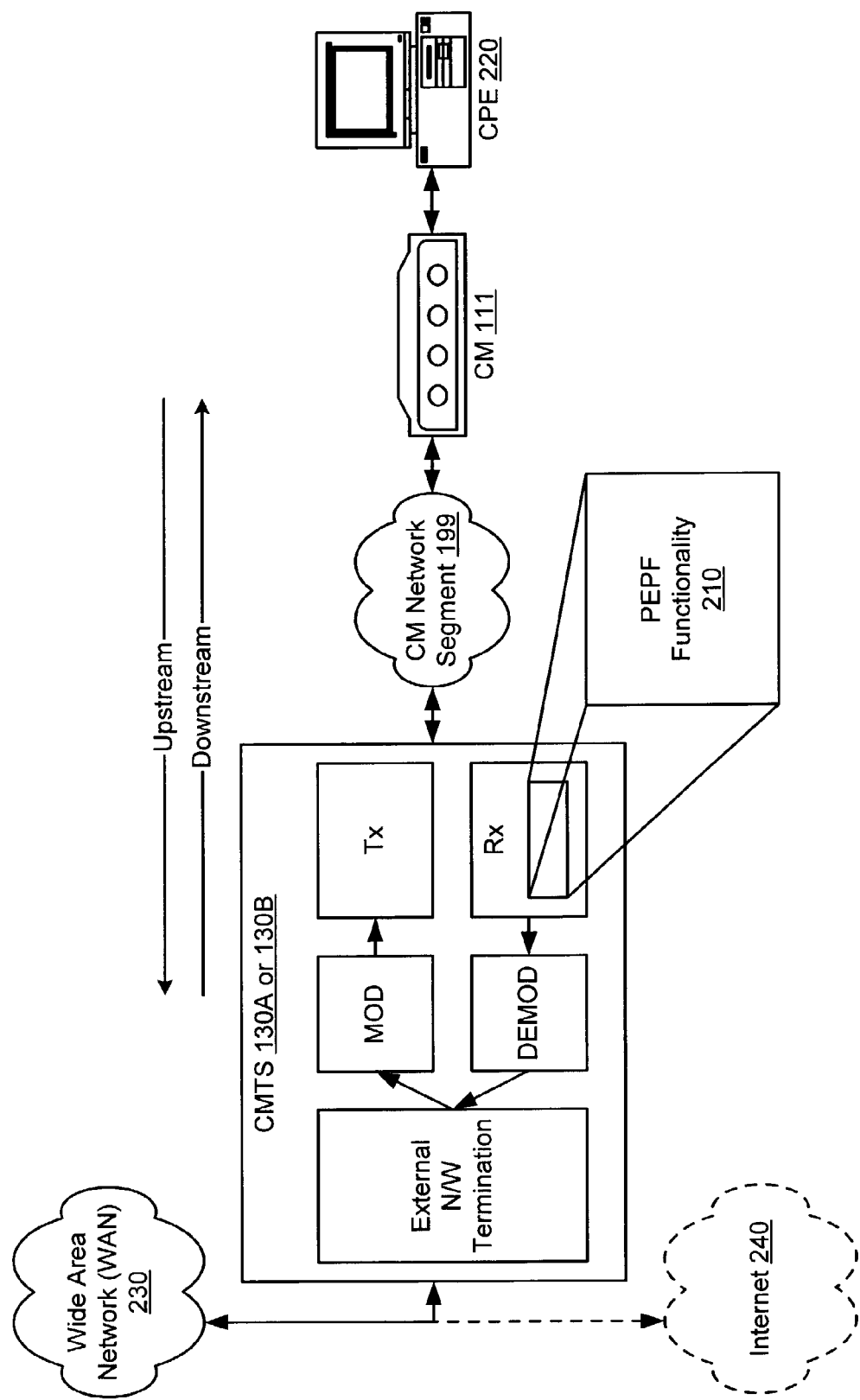
FIG. 2 is a system diagram illustrating in more detail a Cable Modem Termination System (CMTS) and a CM of the present invention.

FIG. 2 is a system diagram illustrating in more detail a CMTS 130A or 130B and a CM 111 of the present invention. The CMTS 130A supports bi-directional communication between a customer premise equipment (CPE) 220 and a network 230 or the Internet 240. The CPE 240 may be a personal computer or another device allowing a user to access an external network. In a typical operation, a CM communication system 200 supports the flow of Internet protocol (IP) traffic between the Internet 240 and the CPE 220 via a CM 111. According to the present invention, the CMTS 130A or 130B supports PEPF.

The WAN 230, and/or the Internet 240, is/are communicatively coupled to the CMTS 130A via the CMTS-NSI. The CMTS 130A is operable to support the external network termination, for one or both of the WAN 230 and the Internet 240. The CMTS 130A includes a modulator and a demodulator to support transmitter and receiver functionality to and from a CM network segment 199. The receiver functionality within the CMTS 130A is operable to support PEPF functionality 210 for S-CDMA according to the invention.

FIG. 3 is a system diagram illustrating a cellular communication system having a base station receiver 340 that services a reverse link according the invention. A mobile transmitter 310 has a local antenna 311. The mobile transmitter 310 may be any number of types of transmitters including a cellular telephone, a wireless pager unit, a mobile computer having transmitter functionality, or any other type of mobile transmitter. The mobile transmitter 310 transmits a signal, using its local antenna 311, to a base station receiver 340 via a wireless communication channel. The base station receiver 340 is communicatively coupled to a receiving wireless tower 349 to be able to receive transmission from the local antenna 311 of the mobile transmitter 310 that have been communicated via the wireless communication channel. The receiving wireless tower 349 communicatively couples the received signal to the base station receiver 340.

The base station receiver 340 supports PEPF functionality according to the present invention, as shown in a functional block 341, on the reverse link received signal. FIG. 3 shows just one of many embodiments where PEPF functionality performed according to the invention may be performed to provide for improved operation within a communication system.

FIG. 4 is a system diagram illustrating a cellular communication system having a mobile receiver 430 that services a forward link according the invention. FIG. 4 illustrates a reverse transmission of the cellular communication system 300 of the FIG. 3. A base station transmitter 420 is communicatively coupled to a transmitting wireless tower 421. The base station transmitter 420, using its transmitting wireless tower 421, transmits a signal to a local antenna 439 via a wireless communication channel. The local antenna 439 communicatively couples to a mobile receiver 430 so that the mobile receiver 430 is able to receive transmission from the transmitting wireless tower 421 of the base station transmitter 420 that have been communicated via the wireless communication channel. The local antenna 439 communicatively couples the received signal to the mobile receiver 430. The mobile receiver 430 may be any number of types of transmitters including a cellular telephone, a wireless pager unit, a mobile computer having transmitter functionality, or any other type of mobile transmitter.

The mobile receiver 430 supports PEPF functionality according to the invention, as shown in a functional block 4311. FIG. 4 shows just one of many embodiments where the PEPF functionality performed according to the invention, may be performed to provide for improved operation within a communication system.

Figure 5:
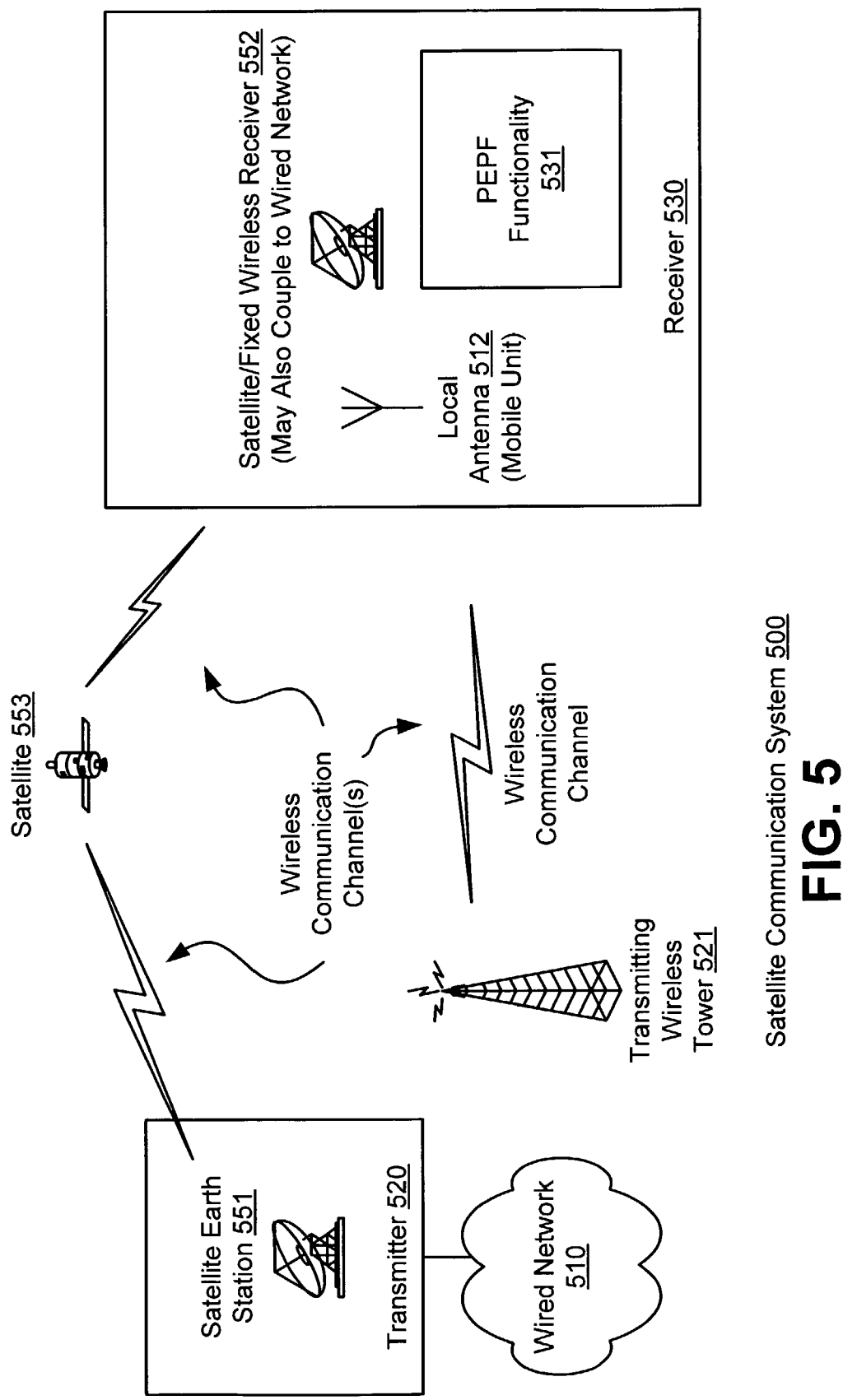
FIG. 5 is a system diagram illustrating a satellite communication system and a fixed wireless communication system, each operating according to the invention.

FIG. 5 is a system diagram illustrating a satellite communication system 500 and a fixed wireless communication system, each operating according to the invention. A transmitter 520 communicatively couples to a wired network 510. The wired network 510 includes any number of networks including the Internet, proprietary networks, . . . , and other wired networks. The transmitter 520 includes a satellite earth station 551 that is able to communicate to a satellite 553 via a wireless communication channel. The satellite 553 is able to communicate with a receiver 530. The receiver 530 is also located on the earth. Here, the communication to and from the satellite 553 may cooperatively be viewed as being a wireless communication channel, or each of the communication to and from the satellite 553 may be viewed as being two distinct wireless communication channels.

For example, the wireless communication "channel" may be viewed as not including multiple wireless hops in one embodiment. In other embodiments, the satellite 553 receives a signal received from the satellite earth station 551, amplifies it, and relays it to the receiver 530; the receiver 530 may include terrestrial receivers such as satellite receivers, satellite based telephones, . . . , and satellite based Internet receivers, among other receiver types. In the case where the satellite 553 receives a signal received from the satellite earth station 551, amplifies it, and relays it, the satellite 553 may be viewed as being a "transponder." In addition, other satellites may exist (and operate in conjunction with the satellite 553) that perform both receiver and transmitter operations. In this case, each leg of an up-down transmission via the wireless communication channel would be considered separately. A wireless communication channel between the satellite 553 and a fixed earth station would likely be less time varying than the wireless communication channel between the satellite 553 and a mobile station.

The satellite 553 communicates with the receiver 530. The receiver 530 may be a mobile unit employing a local antenna 512. Alternatively, the receiver 530 may be a satellite earth station 552 that may be communicatively coupled to a wired network in a similar manner that the satellite earth station 551, within the transmitter 520, communicatively couples to the wired network 510. In both embodiments, the receiver 530 supports PEPF functionality according to the present invention, as shown in a functional block 531.

As is also illustrated in FIG. 5, a fixed wireless system includes a transmitting wireless tower 521 that provides network access to a plurality of wireless receivers 530. The fixed wireless system supports PEPF functionality according to the present invention. The fixed wireless system may also provide broadcast services similar to/same as the services described with reference to FIG. 1.

Figure 6:
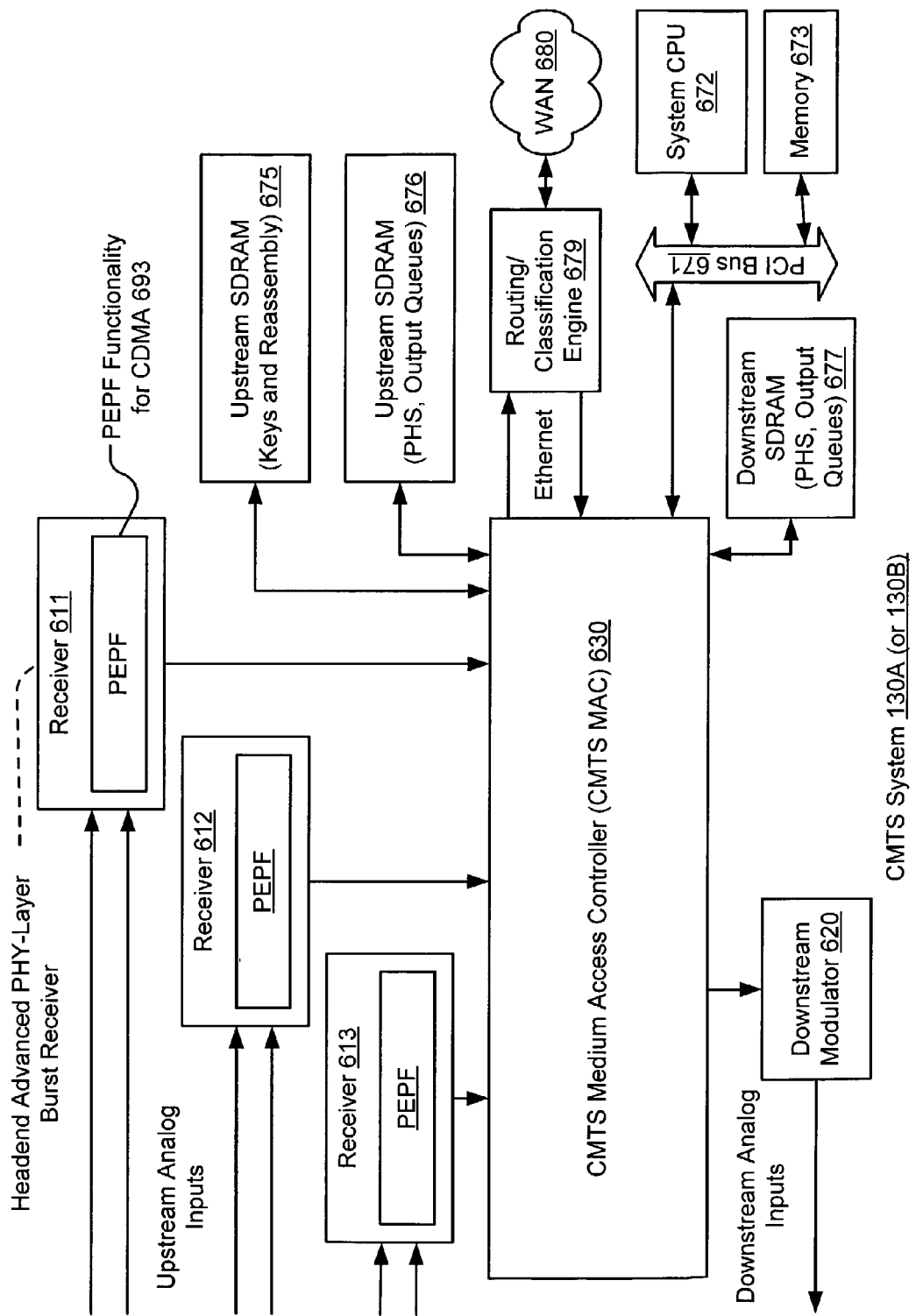
FIG. 6 is a block diagram illustrating a CMTS built according to the present invention.

FIG. 6 is a block diagram illustrating a CMTS 130A (or 130B) built according to the present invention. The CMTS system 130A includes a CMTS medium access controller (MAC) 630 that operates with a number of other devices to perform communication from one or more CMs to a WAN 680. The CMTS MAC 630 provides hardware support for MAC-layer per-packet functions including fragmentation, concatenation, and payload header suppression that all are able to offload the processing required by a system central processing unit (CPU) 672. This will provide for higher overall system performance. In addition, the CMTS MAC 630 is able to provide support for carrier class redundancy via timestamp synchronization across a number of receivers, shown as a receiver 611, a receiver 612, and a receiver 613 that are each operable to receive upstream analog inputs. In certain embodiments, each of the receivers 611, 612, and 613 are dual universal advanced TDMA/CDMA (Time Division Multiple Access/Code Division Multiple Access) PHY-layer burst receivers. That is to say, each of the receivers 611, 612, and 613 includes at least one TDMA receive channel and at least one CDMA receive channel; in this case, each of the receivers 611, 612, and 613 may be viewed as being multi-channel receivers. In other embodiments, the receivers 611, 612, and 613 includes only CDMA receive channels.

In addition, the CMTS MAC 630 may be operated remotely with a routing/classification engine 679 that is located externally to the CMTS MAC 630 for distributed CMTS applications including mini fiber node applications. Moreover, a Standard Programming Interface (SPI) master port may be employed to control the interface to the receivers 611, 612, and 613 as well as to a downstream modulator 620.

The CMTS MAC 630 may be viewed as being a highly integrated CMTS MAC integrated circuit (IC) for use within the various DOCSIS and advanced TDMA/CDMA physical layer (PHY-layer) CMTS products. The CMTS MAC 630 employs sophisticated hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM 675 (operable to support keys and reassembly) and SDRAM 676 (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC 630 includes an out-of-band generator and CDMA PHY-layer (and/or TDMA PHY-layer) interface so that it may communicate with a CM device's out-of-band receiver for control of power management functions. The downstream processor will also use SDRAM 677 (operable to support PHS and output queues). The CMTS MAC 630 may be configured and managed externally via a PCI interface and a PCI bus 671.

Each of the receivers 611, 612, and 613 is operable to support PEPF functionality for CDMA. For example, the receiver 611 is operable to support PEPF functionality for CDMA, the receiver 612 is operable to support PEPF functionality for CDMA, and the receiver 613 is operable to support PEPF functionality for CDMA. FIG. 6 shows yet another embodiment in which PEPF functionality for CDMA may be performed according to the invention. Any of the functionality and operations described in the other embodiments may be performed within the context of the CMTS system 130A without departing from the scope and spirit of the invention.

Figure 7:
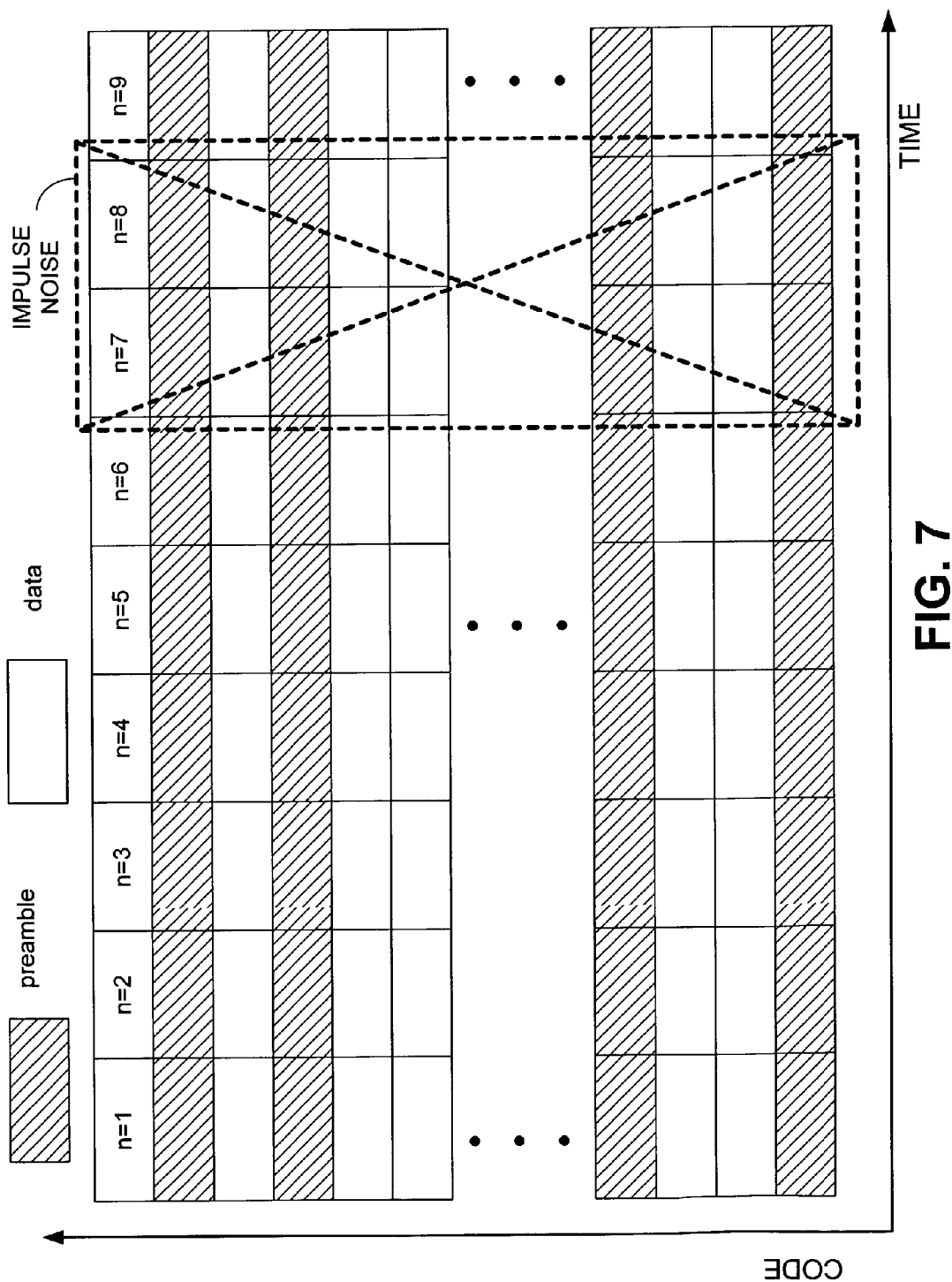
FIG. 7 is a graph illustrating preamble and data symbols received and operated upon by a CMTS (or another) receiver according to the present invention.

FIG. 7 is a graph illustrating preamble and data symbols received and operated upon by a CMTS (or another) receiver according to the present invention. To illustrate the ideas of the present invention without loss of generality, the discussion of the present invention is made with reference to S-CDMA systems. In S-CDMA systems, the preamble and data signals transmitted by different users, i.e., CMs, are transmitted on different spreading codes. All signals are synchronously added on the channel supported by the CM network segment 199. Burst (impulse) noise is also added to the combined signal. The non-CDMA case could be also treated within the same framework, as a single user signal with no spreading, which is corrupted by impulse noise.

FIG. 7 shows a general S-CDMA signal structure after despreading. The horizontal axis of the rectangular frame structure represents time (in symbol intervals) and the vertical axis represents different spreading codes. Here many user signals could be transmitted at the same time but on different spreading codes. Nine symbol times, $n=1, \ldots, 9$, are illustrated in FIG. 7. As is shown, some spreading codes carrying preamble symbols while other spreading codes carry data. FIG. 7 also illustrates the corruptive effect of impulse noise on S-CDMA signals after despreading (during symbol times $n=7$ and $n=8$). Here we note that the impulse noise is added to the signal in the time domain, thus it affects only a few columns of the S-CDMA frame structure.

According to the present invention, it is first determined which of the symbols of the preamble have been corrupted by impulse noise. With this information determined, the following benefits may be realized:

1. Using corrupted preamble symbols in the columns corrupted by strong impulse noise in the estimation of user parameters such as gain, phase, and frequency offsets is avoided. Thus, only clean preamble symbols in the estimation process are employed. If corrupted preamble symbols are blindly included in the estimation process, the system throughput could be reduced significantly.

2. Forward error correction (FEC) decoders, such as Viterbi and Reed-Solomon decoders, may exploit knowing which data are corrupted by impulse noise to enhance their data error correction capability.

Figure 8:
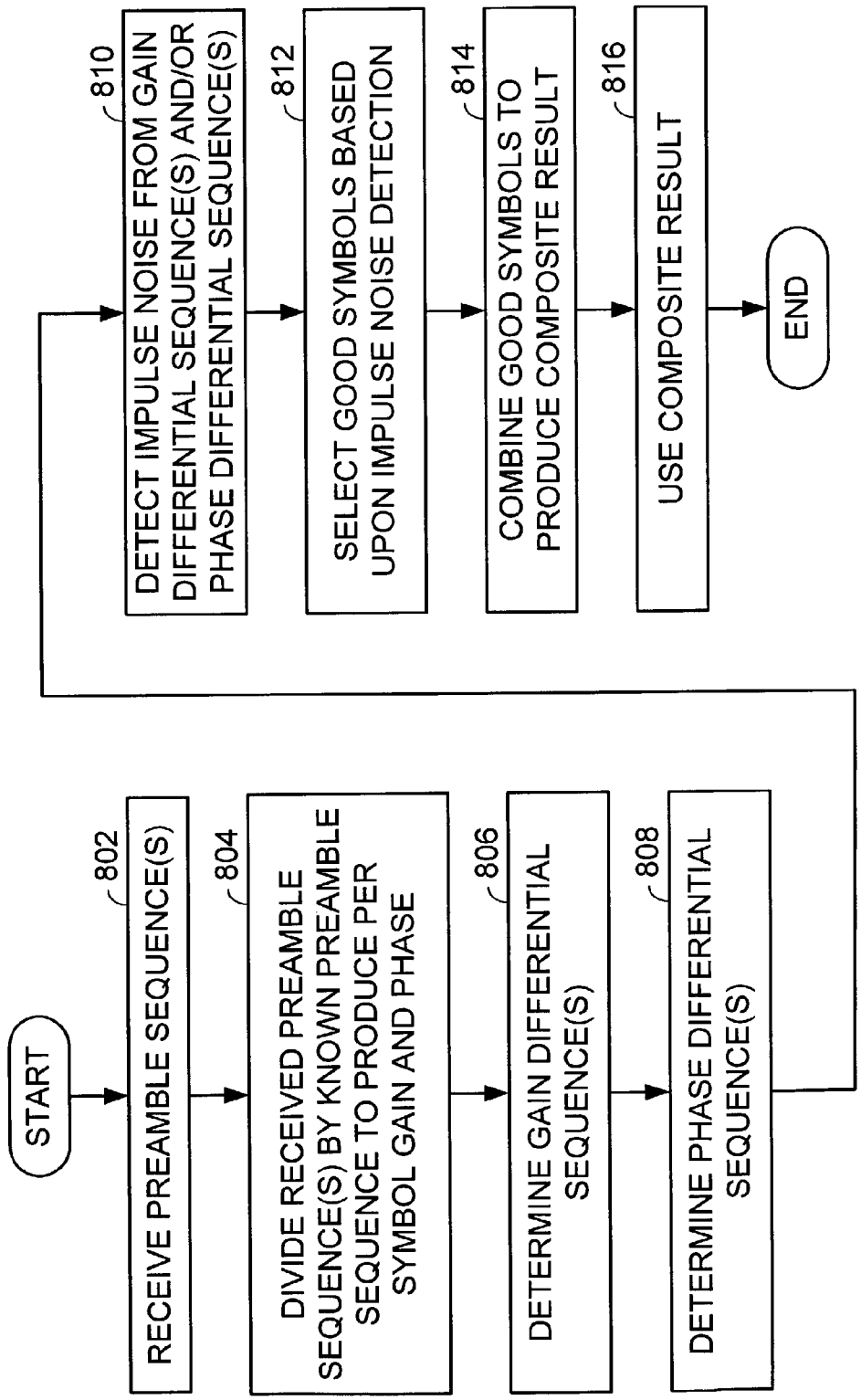
FIG. 8 is a logic diagram illustrating operation of the present invention in operating upon a preamble to detect burst (impulse) noise and in operating upon the preamble based upon the determination.

FIG. 8 is a logic diagram illustrating operation of the present invention in operating upon a preamble to detect burst (impulse) noise and in operating upon the preamble based upon the determination. The operations of FIG. 8 are performed within a digital communication receiver, such as those illustrated with reference to FIGS. 1–6. Various structures may be employed to perform the operations described herein. Examples of such structures include both dedicated signal path structures and non-dedicated signal path processors. The operations of FIG. 8 would typically be performed in a baseband processor after received signals have been converted to baseband. The operations of the present invention are not limited to a particular structure. Operation commences with the receipt of one or more preamble sequences. As was described with reference to FIG. 7, in a S-CDMA system, a CMTS will receive a number of uplink signals from a plurality of serviced CMs. These signals arrive spread and synchronized in time. One or more of these signals is a preamble sequence that includes a group of preamble symbols. Thus, as a first operation of FIG. 8, the preamble sequence(s) are received (step 802). In a S-CDMA system or another CDMA system, the preamble sequences may have been despread when the operation of step 802 is performed. With further description of FIG. 8, each received preamble sequence is denoted as: $\{x(1), x(2), \ldots, x(L)\}$, where L is the preamble length. With continued discussion of FIG. 8 and subsequent FIGS., it is assumed that the preamble extends only over one code.

Next, the received preamble symbols are divided by known preamble symbols to obtain the sequence $\{z(k)=x(k)/p(k)\}$, where $\{p(k)\}$ is the known preamble sequence (step 804). The sequence $\{z(k)\}$ could be averaged vertically if it extends over multiple codes in the SCDMA case. Next, a gain differential sequence a(k) is obtained (step 806). In one embodiment, the gain differential sequence is determined according to Eq. (1)

$$\Delta \alpha(k) = |z(k+1)| - |z(k)|, \quad k=1 \ldots L-1$$

$$\Delta \alpha(L) = |z(1)| - |z(L)|$$

$$a(k) = |\Delta \alpha(k)| \quad \text{Eq. (1)}$$

Next, a phase differential sequence d(k) is obtained (step 808). In one embodiment, the phase differential sequence d(k) is determined according to Eq. (2):

$$\Delta \phi(k) = \text{angle}[z(k+1)z^*(k)], \quad k=1 \ldots L-1$$

$$\omega_{coarse} = \text{mean}[\Delta \phi(k)], \quad k=2 \ldots L-2$$

$$\Delta \phi(L) = \text{angle}[z(1)z^*(L)] + (L-2)\omega_{coarse}$$

$$d(k) = |\Delta \phi(k) - \omega_{coarse}| \quad \text{Eq. (2)}$$

Impulse noise is then detected from one or both of the gain differential sequence and the phase differential sequence (step 810). In one operation, the detection of impulse noise is based on comparing the two sequences a(k) and d(k) to programmable thresholds that are computed based on known information of the SNR of the channel (noise variance). In particular, these determinations may be determined according to Eq. (3)

$$\text{if}[d(k)>th \ \& \ d(k-1)>th] \text{OR}[a(k)>th \ \& \ a(k-1)>th]$$

$$\text{erase\_flag}(k)=1 \quad \text{Eq. (3)}$$

The erase_flag(k) for each symbol period is then used to determine which symbols of the preamble sequence are good (step 812). The same procedure is then repeated for different user preamble sequences and the obtained detection results could be combined to obtain a higher probability of accurate detection. The good symbols of the preamble sequence may be considered a subgroup of symbols. This subgroup of good symbols is then combined to produce a composite result (step 814). This composite result may then be used to estimate the frequency of the preamble, the phase of the preamble, and the gain of the preamble. These results may then be used for input gain settings, frequency correction, and phase correction of data symbols corresponding to the preamble. Further, the subgroup of valid preamble symbols may be employed for equalizer training and other operations requiring channel characterization.

FIG. 9 is a graph illustrating preamble gain of a plurality of preamble symbols as determined according to the present invention. As shown in FIG. 9, the preamble gain for symbol periods n=1 through n=9 is considered. As noted, the symbol of symbol time n=8 has a larger preamble gain than do the other symbols.

FIG. 10 is a graph illustrating delta preamble gain of a plurality of preamble symbols and related error detection as determined according to the present invention. When the delta preamble gain for the preamble sequence of FIG. 9 is considered, the resultant for symbol times n=7 and n=8 violate selected thresholds. Such result provides a first indication that the preamble symbols corresponding to symbol times n=7 and n=8 coexist with impulse noise. These indications compare favorably to the position of the impulse noise as illustrated in FIG. 7. The symbols corresponding to symbol positions n=7 and n=8 are erased from consideration in further processing.

Figure 11:
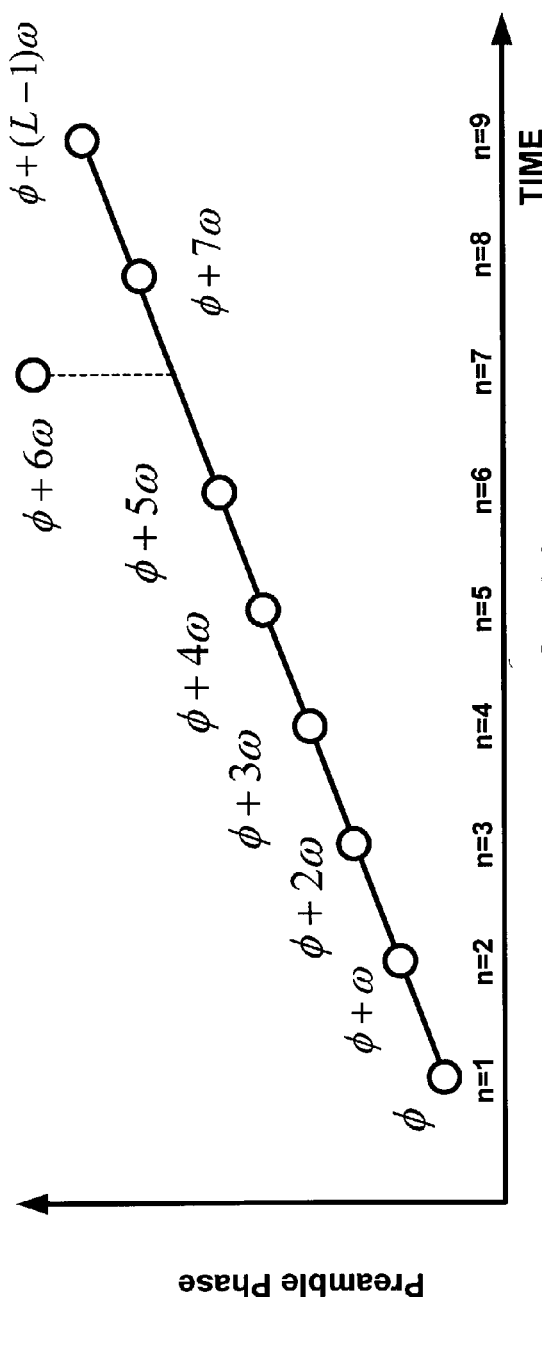
FIG. 11 is a graph illustrating preamble phase of a plurality of preamble symbols as determined according to the present invention.

FIG. 11 is a graph illustrating preamble phase of a plurality of preamble symbols as determined according to the present invention. As illustrated, the phase of the preamble sequence is increasing with time and most of the preamble phase of the symbols falls along a straight line. However, the preamble symbols corresponding to symbol times n=7 and n=8 do not correspond to this straight line.

Figure 12:
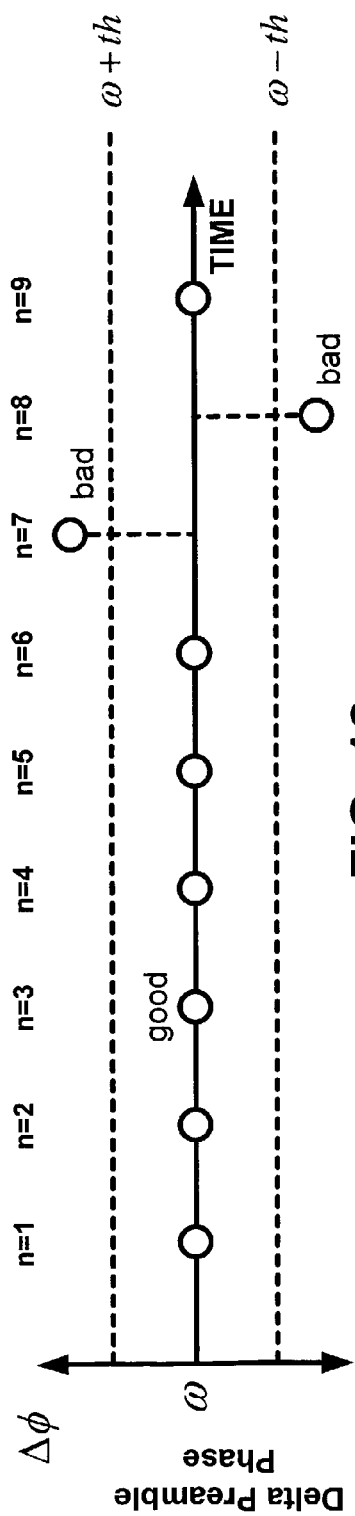
FIG. 12 is a graph illustrating delta preamble phase of a plurality of preamble symbols and related error detection as determined according to the present invention.

FIG. 12 is a graph illustrating delta preamble phase of a plurality of preamble symbols and related error detection as determined according to the present invention. As is shown, the delta preamble phase methodology of the method of the present invention also determines that the symbols corresponding to symbol positions n=7 and n=8 are bad and should be erased from consideration in further processing.

Figure 13:
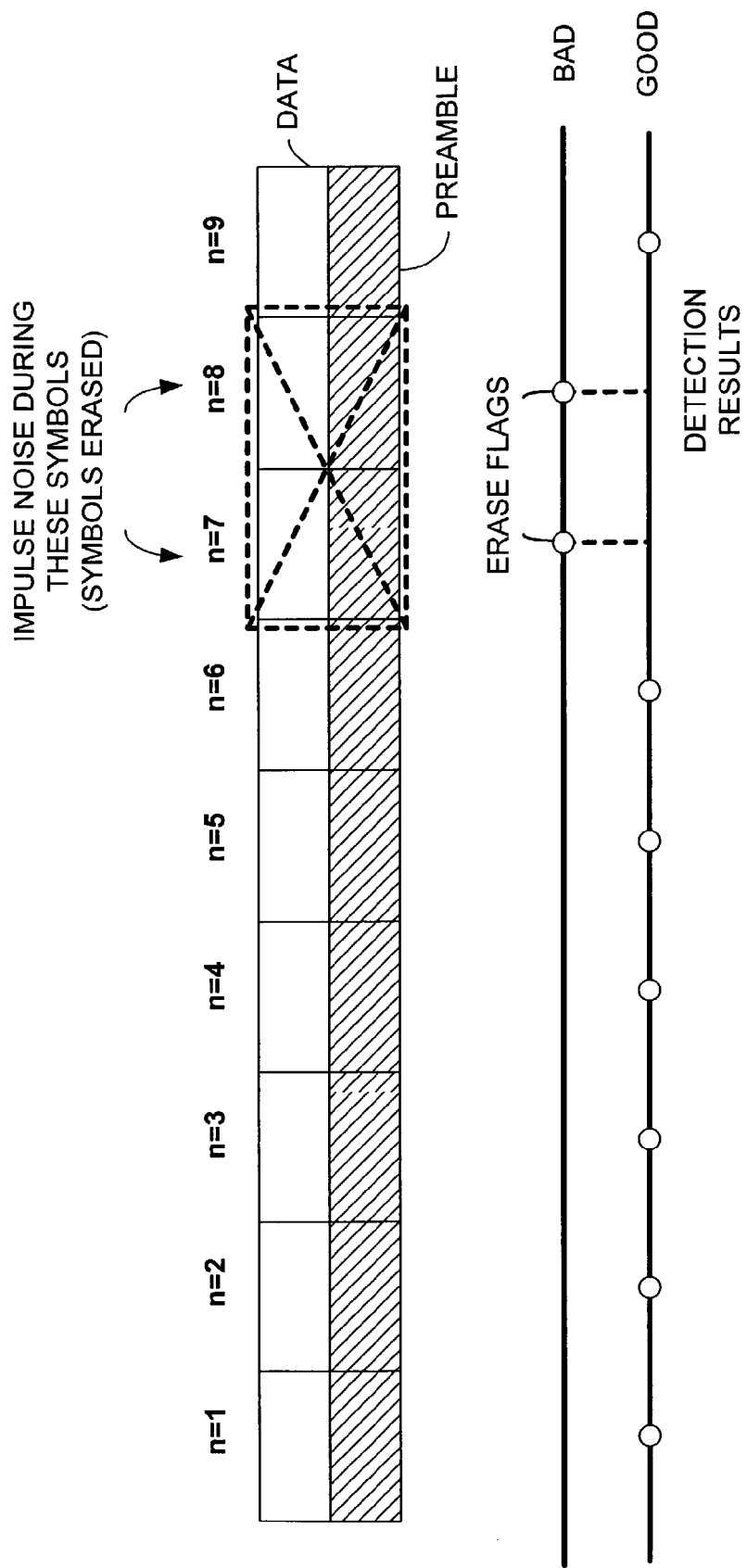
FIG. 13 is a graph illustrating erasure flags corresponding to a plurality of preamble symbols as determined according to the present invention.

FIG. 13 is a graph illustrating erasure flags corresponding to a plurality of preamble symbols as determined according to the present invention. The results of the operations of FIG. 8 are summarized in FIG. 13 to indicate that the preamble symbols corresponding to symbol times n=7 and n=8 should be removed from further consideration in subsequent processing. The operations of FIG. 14 will describe how these operations are accomplished.

In a S-CDMA system, the procedure described with reference to FIGS. 8–13 may be repeated for different user preamble sequences and the obtained detection results may be combined to obtain a higher probability of accurate detection. The detection procedure may limited to the detection of bad symbols based upon gain only or phase only. The detection process could also be limited to a given number of users based on the available processing power in the system.

Figure 14:
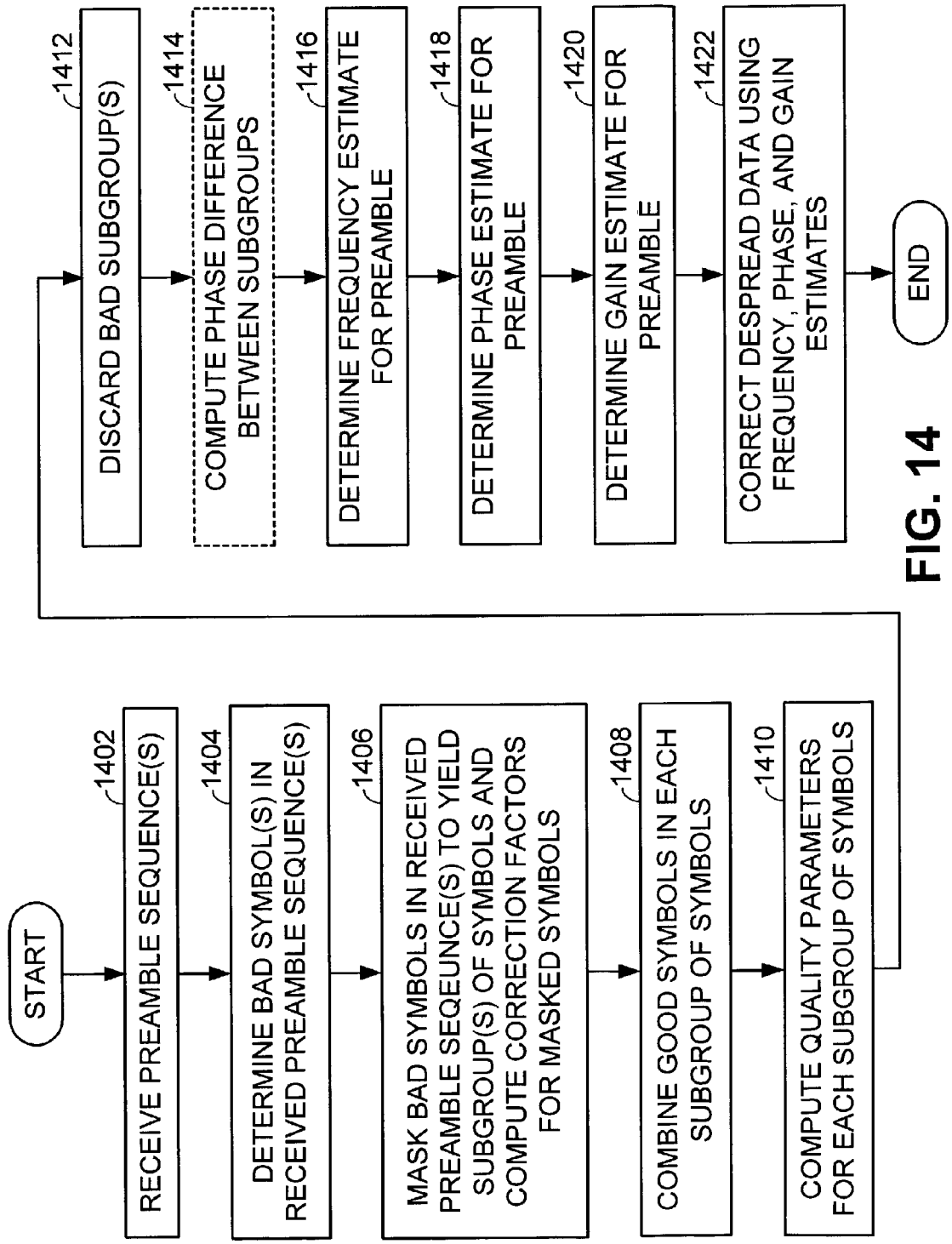
FIG. 14 is a logic diagram illustrating operation of the present invention in operating upon a preamble to detect burst (impulse) noise, to erase preamble symbols, to combine good preamble symbols, and to determine frequency, phase, and gain estimates of the preamble.

FIG. 14 is a logic diagram illustrating operation of the present invention in operating upon a preamble to detect burst (impulse) noise, to erase preamble symbols, to combine good preamble symbols, and to determine frequency, phase, and gain estimates of the preamble. Thus, as a first operation of FIG. 14, the preamble sequence(s) are received (step 1402). Next, bad symbols in the received preamble sequence(s) are determined (step 1404). Once the bad symbols in each of received preamble sequence(s) are determined, bad symbols are masked and correction factors are also determined for the masked symbols (step 1406). The correction factors are applied to the erased/bad symbols in the subgroup(s) of symbols.

The resulting sequence is divided into subgroups and the good elements in each subgroup are combined (step 1408). In this operation, good symbols are not erased. Subgroup symbol combining may be performed by averaging according to Eq. (4):

$$z_s(n) = \sum_{n=(i-1)L_1+1}^{nL_1} z(k) \cdot \overline{e}(k) \qquad \text{Eq. (4)}$$

For each subgroup, the following quality parameters (and correction parameters) are determined (step 1410):

$$d_{LI}(k) = \frac{k - 1 - (L_1 - 1)/2}{L_1 - 1}, k = 1 \ldots L_1 \qquad \text{Eq. (5)}$$

$$c_s(n) = \sum_{n=(i-1)L_1+1}^{nL_1} d_{LI}(k) \cdot e(k) + (n-1)L_1$$

$$e_s(n) = \sum_{k=(n-1)L_1+1}^{nL_1} e(k)$$

Here, $d_{L1}(k) \cdot \omega$ to is the phase difference caused by dropping the $k^{th}$ sample, $c_s(n) \cdot \omega$ is the total phase difference caused to the $n^{th}$ sub-group, and $e_s(n)$ is the number of bad symbols in the $n^{th}$ sub-group. Then, bad subgroup(s) are discarded (step 1412) such that only good subgroups are kept The operations of FIG. 14 may be performed according to Eq. (6) as follows:

$$z_g=[\ ];c_g=[\ ];$$

$$\text{if } e_s(n)<L_1:z_g=[z_g,z_s(n)];c_g=[c_g,c_s(n)];$$

$$n=1,2,\ldots,L/L_1 \qquad \text{Eq. (6)}$$

Then, the phase difference between subgroups is are computed (at step 1414 if more than one subgroup is considered) by:

$$\Delta\phi(m) = \frac{\text{angle}[z_g(m) \cdot z_g^*(m+1)]}{c_g(m+1) - c_g(m)}, \qquad \text{Eq. (7)}$$

$$m = 1, 2, \ldots, \text{length}(z_g) - 1$$

A frequency estimate for the preamble is computed then computed (step 1416). This frequency estimate may be determined according to Eq. (8) as:

$$\hat{\omega} = \frac{1}{I} \cdot \text{mean}[\Delta\phi(m)] \qquad \text{Eq. (8)}$$

where I is the interleaving depth of the preamble sequence. Similarly, phase estimates (step 1418) and gain estimates (step 1420) are obtained. The phase and frequency estimates may be determined according to:

$$d_L(k) = \frac{k - 1 - (L - 1)/2}{L - 1}, k = 1 \ldots L \qquad \text{Eq. (9)}$$

$$c_\phi = (L-1)/2 + \sum_{k=1}^{L} d_L(k) \cdot e(k), c_\alpha = \frac{1}{L - \sum_{k=1}^{L} e(k)}$$

$$\hat{\phi} = \text{angle}\left[\sum_{k=1}^{L} z(k) \cdot \overline{e}(k)\right] - c_\phi \cdot \hat{\omega} \qquad \text{Eq. (10)}$$

$$\hat{\alpha} = \text{abs}\left[\sum_{k=1}^{L} z(k) \cdot \overline{e}(k)\right] \cdot c_\alpha \qquad \text{Eq. (11)}$$

With estimates for the carrier frequency, phase, and gain offsets in hand, the whole despread data could be corrected for these offsets (step 1422). The corrected data using the initial offset estimates is sliced. Each despread data symbol is divided by the corresponding sliced data decision. The obtained sequence is then averaged across different codes to obtain a less noisy sequence, which is then used to estimate the carrier frequency, phase, and gain offsets again. The procedure can be repeated (iterated) to obtain a more accurate carrier offset estimates.

Figure 15:
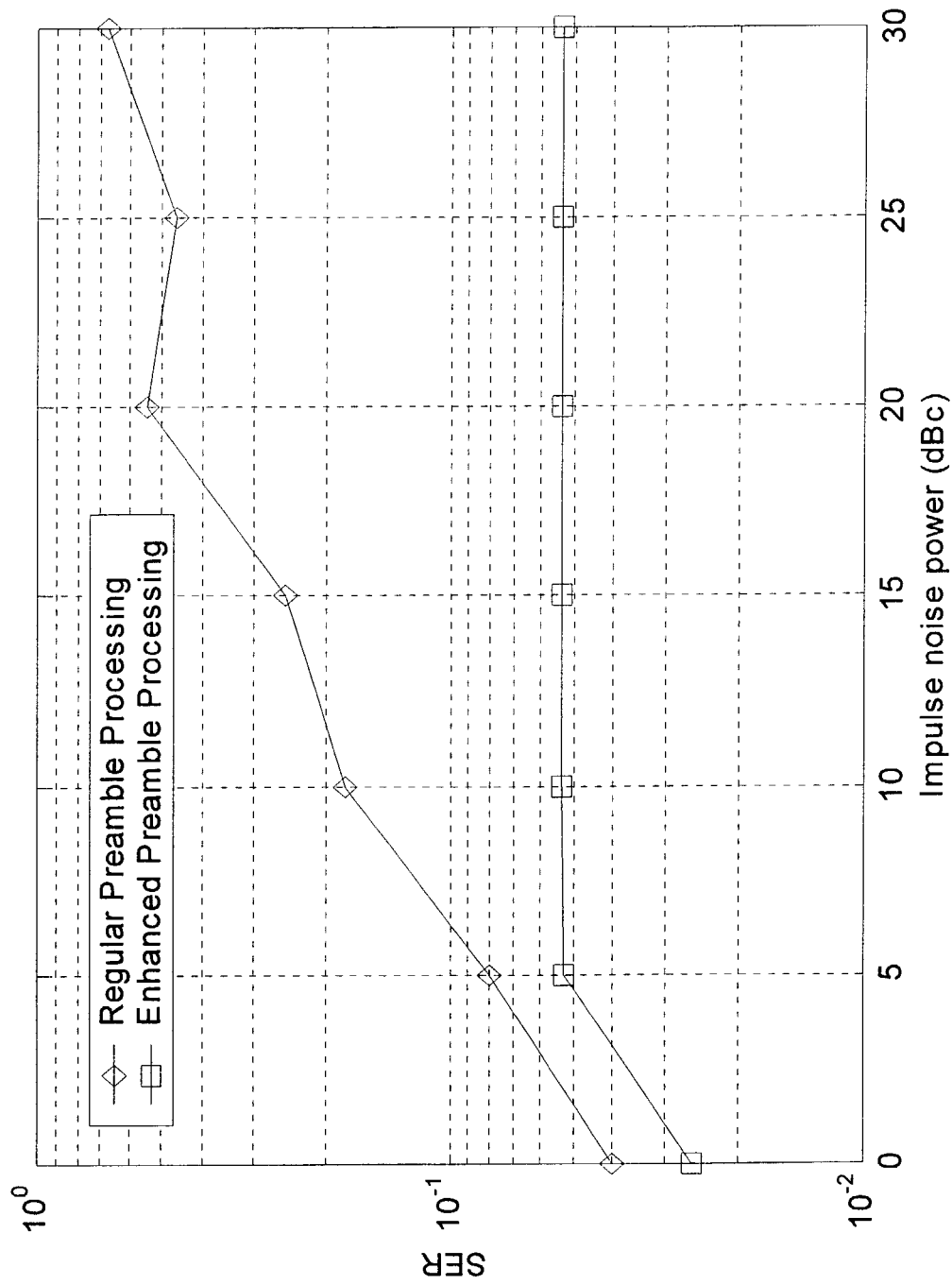
FIG. 15 is a graph illustrating how system performance improves when operating according to the present invention.

FIG. 15 is a graph illustrating how system performance improves when operating according to the present invention. Operation according to the present invention occurs in FIG. 15 with a baud rate of 5.12 MHz, an impulse noise duration of 10 micro sec. (One hit/frame) with K=32, L=32, a 64 QAM constellation and a SNR of 35 dB.

Figure 16:
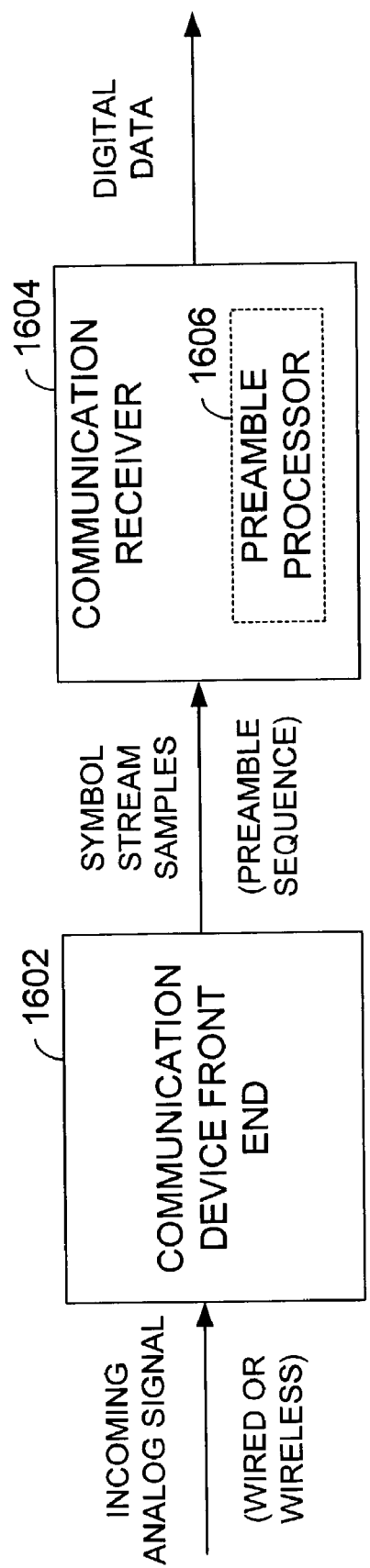
FIG. 16 is a block diagram illustrating a communication device constructed according to the present invention.

FIG. 16 is a block diagram illustrating a communication device constructed according to the present invention. The communication device includes a communication device front end 1602 and a communication receiver 1604. The communication device front end 1602 receives an incoming analog signal and that processes the incoming analog signal to produce a preamble sequence. The communication receiver 1604 operably couples to the communication device front end and performs a plurality of operations to detect impulse noise in the preamble sequence. As a first operation, the communication receiver receives the preamble sequence that includes a plurality of preamble symbols. The communication receiver then divides the plurality of preamble symbols by at least one known preamble symbol to produce a plurality of preamble gains and/or a plurality of preamble phases corresponding to the plurality of preamble symbols.

Finally, the communication receiver determines, based upon the plurality of preamble gains and/or the plurality of preamble phases, that at least one preamble symbol has been adversely affected by impulse noise. The communication receiver 1604 may include a dedicated component, e.g., a preamble processor 1606 that performs the operations of the present invention. Alternately, a general processing component, e.g., a Digital Signal Processor, host processor, or another processor may perform operations according to the present invention. In either case, the processing of incoming signals may be performed via a dedicated or non-dedicated signal path, depending upon the embodiment.

In view of the above detailed description of the invention and associated drawings, other modifications and variations will now become apparent. It should also be apparent that such other modifications and variations may be effected without departing from the spirit and scope of the invention.

The invention claimed is:

1. A method for processing a preamble sequence in the presence of impulse noise, the method comprising:
   receiving the preamble sequence that includes a plurality of preamble symbols;
   determining that at least one preamble symbol of the plurality of preamble symbols has been adversely affected by impulse noise;
   masking the at least one preamble symbol of the plurality of preamble symbols to produce a subgroup of preamble symbols; and
   based upon the subgroup of preamble symbols, determining at least one of a frequency estimate for the subgroup of preamble symbols, a phase estimate for the subgroup of preamble symbols, and a gain estimate for the subgroup of preamble symbols.

2. The method of claim 1, further comprising:
   determining a correction factor for the subgroup of preamble symbols; and
   applying the correction factor to the subgroup of preamble symbols to produce a corrected subgroup of preamble symbol.

3. The method of claim 2, wherein the correction factor corrects at least one of frequency offset, phase offset, and gain offset of the subgroup of preamble symbols.

4. The method of claim 2, further comprising estimating channel parameters based upon the corrected subgroup of preamble symbols.

5. The method of claim 2, further comprising applying the correction factor for the subgroup of preamble symbols to a plurality of data symbols that correspond to the plurality of preamble symbols.

6. The method of claim 1, wherein determining that at least one preamble symbol of the plurality of preamble symbols has been adversely affected by impulse noise comprises:
   dividing the plurality of preamble symbols by at least one known preamble symbol to produce a plurality of preamble gains corresponding to the plurality of preamble symbols; and
   determining, based upon the plurality of preamble gains, that at least one preamble symbol has been adversely affected by impulse noise.

7. The method of claim 6, wherein determining, based upon the plurality of preamble gains, that at least one preamble symbol has been adversely affected by impulse noise comprises:
   from the plurality of preamble gains, determining a gain differential sequence that includes a plurality of gain differential values; and
   for each gain differential value that exceeds a gain differential threshold, determining that a corresponding preamble symbol has been adversely affected by impulse noise.

8. The method of claim 1, wherein determining that at least one preamble symbol of the plurality of preamble symbols has been adversely affected by impulse noise comprises:
   dividing the plurality of preamble symbols by at least one known preamble symbol to produce a plurality of preamble phases corresponding to the plurality of preamble symbols; and
   determining, based upon the plurality of preamble phases, that at least one preamble symbol has been adversely affected by impulse noise.

9. The method of claim 8, wherein determining, based upon the plurality of preamble phases, that at least one preamble symbol has been adversely affected by impulse noise comprises:
   from the plurality of preamble phases, determining a phase differential sequence that includes a plurality of phase differential values; and
   for each phase differential value that exceeds a phase differential threshold, determining that a corresponding preamble symbol has been adversely affected by impulse noise.

10. The method of claim 1, further comprising combining the subgroup of preamble symbols to produce a composite result.

11. The method of claim 1, wherein the preamble sequence is received via a wired communication link.

12. The method of claim 1, wherein the preamble sequence is received via a wireless communication link.

13. The method of claim 1, wherein the preamble sequence is received and processed by a cable modem communication system receiver.

14. The method of claim 13, wherein the preamble sequence is received and processed by a Cable Modem Termination System.

15. A communication device comprising:
   a communication device front end that receives an incoming analog signal and processes the incoming analog signal to produce a preamble sequence;
   a communication receiver operably coupled to the communication device front end that performs a plurality of operations to process the preamble sequence, wherein the communication receiver:
   receives the preamble sequence that includes a plurality of preamble symbols;
   determines that at least one preamble symbol of the plurality of preamble symbols has been adversely affected by impulse noise;
   masks the at least one preamble symbol of the plurality of preamble symbols to produce a subgroup of preamble symbols; and
   based upon the subgroup of preamble symbols, determines at least one of a frequency estimate for the subgroup of preamble symbols, a phase estimate for the subgroup of preamble symbols, and a gain estimate for the subgroup of preamble symbols.

16. The communication device of claim 15, wherein the communication receiver further:
   determines a correction factor for the subgroup of preamble symbols; and
   applies the correction factor to the subgroup of preamble symbols to produce a corrected subgroup of preamble symbols.

17. The communication device of claim 16, wherein the communication receiver applies the correction factor to the subgroup of preamble symbols in order to correct at least one of frequency offset, phase offset, and gain offset.

18. The communication device of claim 16, wherein the communication receiver further estimates channel parameters based upon the corrected subgroup of preamble symbols.

19. The communication device of claim 16, wherein the communication receiver further applies the correction factor for the subgroup of preamble symbols to a plurality of data symbols that correspond to the plurality of preamble symbols.

20. The communication device of claim 15, wherein the communication receiver determines that at least one preamble symbol of the plurality of preamble symbols has been adversely affected by impulse noise by:

dividing the plurality of preamble symbols by at least one known preamble symbol to produce a plurality of preamble gains corresponding to the plurality of preamble symbols; and determining, based upon the plurality of preamble gains, that at least one preamble symbol has been adversely affected by impulse noise.

21. The communication device of claim 20, wherein the communication receiver determines, based upon the plurality of preamble gains, that at least one preamble symbol has been adversely affected by impulse noise by:

from the plurality of preamble gains, determining a gain differential sequence that includes a plurality of gain differential values; and for each gain differential value that exceeds a gain differential threshold, determining that a corresponding preamble symbol has been adversely affected by impulse noise.

22. The communication device of claim 15, wherein the communication receiver determines that at least one preamble symbol of the plurality of preamble symbols has been adversely affected by impulse noise by:

dividing the plurality of preamble symbols by at least one known preamble symbol to produce a plurality of preamble phases corresponding to the plurality of preamble symbols; and determining, based upon the plurality of preamble phases, that at least one preamble symbol has been adversely affected by impulse noise.

23. The communication device of claim 22, wherein the communication receiver determines, based upon the plurality of preamble phases, that at least one preamble symbol has been adversely affected by impulse noise by:

from the plurality of preamble phases, determining a phase differential sequence that includes a plurality of phase differential values; and for each phase differential value that exceeds a phase differential threshold, determining that a corresponding preamble symbol has been adversely affected by impulse noise.

24. The communication device of claim 15, wherein the communication receiver further combines the subgroup of preamble symbols to produce a composite result.

25. The communication device of claim 15, wherein the communication device front end services a wired communication link.

26. The communication device of claim 15, wherein the communication device front end services a wireless communication link.

27. The communication device of claim 15, wherein the communication device front end is a cable modem communication system receiver.

28. The communication device of claim 27, wherein the communication device is a Cable Modem Termination System.

29. A communication receiver comprising:

means for receiving a preamble sequence that includes a plurality of preamble symbols;

means for determining that at least one preamble symbol of the plurality of preamble symbols has been adversely affected by impulse noise;

means for masking the at least one preamble symbol of the plurality of preamble symbols to produce a subgroup of preamble symbols; and means, based upon the subgroup of preamble symbols, for determining, at least one of a frequency estimate for the subgroup of preamble symbols, a phase estimate for the subgroup of preamble symbols, and a gain estimate for the subgroup of preamble symbols.

* * * * *